US012754106B2

(12) United States Patent
Ranner et al.

(10) Patent No.: US 12,754,106 B2
(45) Date of Patent: Oct. 6, 2026

(54) METHOD FOR PRODUCING A SECTION RIBBON FROM A SAMPLE BLOCK USING A MICROTOME, METHOD FOR PREPARING A MICROSCOPIC SAMPLE FOR EXAMINATION IN AN ELECTRON MICROSCOPE, MICROTOME AND EMBEDDING MOULD FOR USE THEREIN

(71) Applicant: LEICA MIKROSYSTEME GMBH, Vienna (AT)

(72) Inventors: Robert Ranner, Vienna (AT); Michael Zimmermann, Vienna (AT); Peer Oliver Kellermann, Vienna (AT)

(73) Assignee: LEICA MIKROSYSTEME GMBH, Vienna (AT)

(*) Notice: Subject to any disclaimer, the term of this patent is extended or adjusted under 35 U.S.C. 154(b) by 202 days.

(21) Appl. No.: 18/576,140

(22) PCT Filed: May 17, 2022

(86) PCT No.: PCT/EP2022/063250
§ 371 (c)(1),
(2) Date: Jan. 3, 2024

(87) PCT Pub. No.: WO2023/280458
PCT Pub. Date: Jan. 12, 2023

(65) Prior Publication Data

US 2024/0328904 A1 Oct. 3, 2024

(30) Foreign Application Priority Data

Jul. 6, 2021 (EP) .................................... 21183967

(51) Int. Cl.
*G01N 1/06* (2006.01)
*G01N 1/36* (2006.01)

(52) U.S. Cl.
CPC ................. *G01N 1/06* (2013.01); *G01N 1/36* (2013.01); *G01N 2001/366* (2013.01)

(58) Field of Classification Search
CPC ....... G01N 1/06; G01N 1/36; G01N 2001/366
See application file for complete search history.

(56) References Cited

U.S. PATENT DOCUMENTS 3,832,923 A 9/1974 Lassmann et al.
10,267,713 B2 4/2019 Chen
(Continued)

FOREIGN PATENT DOCUMENTS

JP 2007/033312 A 2/2007
JP 2018/059892 A 4/2018

OTHER PUBLICATIONS

Horstmann, H. et al., "Serial Section Scanning Electron Microscopy ($S^3$EM) on Silicon Wafers for Ultra-Structural Volume Imaging of Cells and Tissues", PLoS ONE 7(4), Apr. 2012, e35172, pp. 1-8, US.

(Continued)

*Primary Examiner* — Omar Flores Sanchez
(74) *Attorney, Agent, or Firm* — LEYDIG, VOIT & MAYER, LTD.

(57) ABSTRACT

A method for producing a section ribbon from a sample block includes producing a first part ribbon of the section ribbon from a first surface region of the sample block using a microtome comprising a blade. The first part ribbon has one or more first sections of the sample block. The method further includes producing a second part ribbon of the section ribbon from a second surface region of the sample block using the microtome comprising the blade. The second part ribbon has one or more second sections of the sample block. The second surface region is different from the first surface region. The method further includes retracting the
(Continued)

sample block from the blade between the producing of the first part ribbon and the producing of the second part ribbon.

26 Claims, 8 Drawing Sheets

(56) References Cited

U.S. PATENT DOCUMENTS

| | | | | |
|---|---|---|---|---|
| 11,060,955 | B2 * | 7/2021 | Spomer | G01N 1/06 |
| 2002/0162843 | A1 | 11/2002 | Alley | |
| 2010/0167338 | A1 | 7/2010 | Amano et al. | |
| 2015/0135917 | A1 | 5/2015 | Hess et al. | |
| 2020/0149999 | A1 | 5/2020 | Masuda et al. | |
| 2020/0193653 | A1 * | 6/2020 | Kellermann | G01N 1/06 |
| 2022/0349787 | A1 * | 11/2022 | Zhuang | G01N 1/30 |
| 2023/0221214 | A1 * | 7/2023 | Kirmse | G01N 1/06 427/2.11 |
| 2024/0118295 | A1 * | 4/2024 | Schleifer | G01N 35/00029 |
| 2024/0328904 | A1 * | 10/2024 | Ranner | G01N 1/06 |

OTHER PUBLICATIONS

Harris, K.M. et al., "Uniform Serial Sectioning for Transmission Electron Microscopy", J. Neurosci. 26(47), Nov. 22, 2006, pp. 12101-12103, Society for Neuroscience, US.

* cited by examiner

Fig. 2A
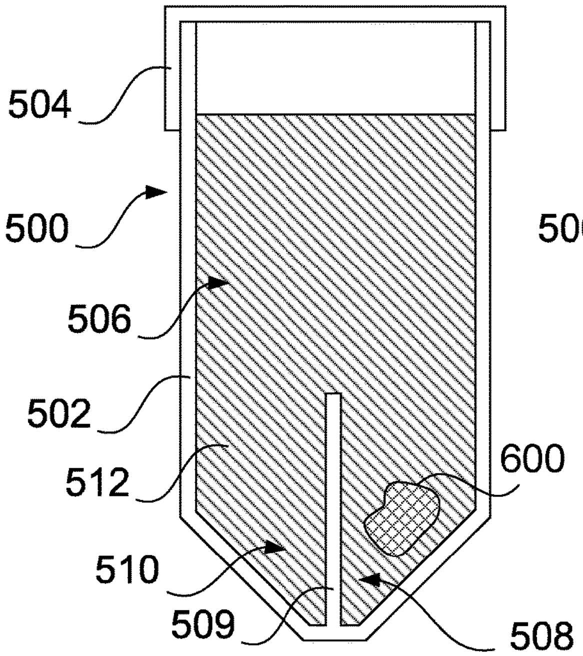
Fig. 3A
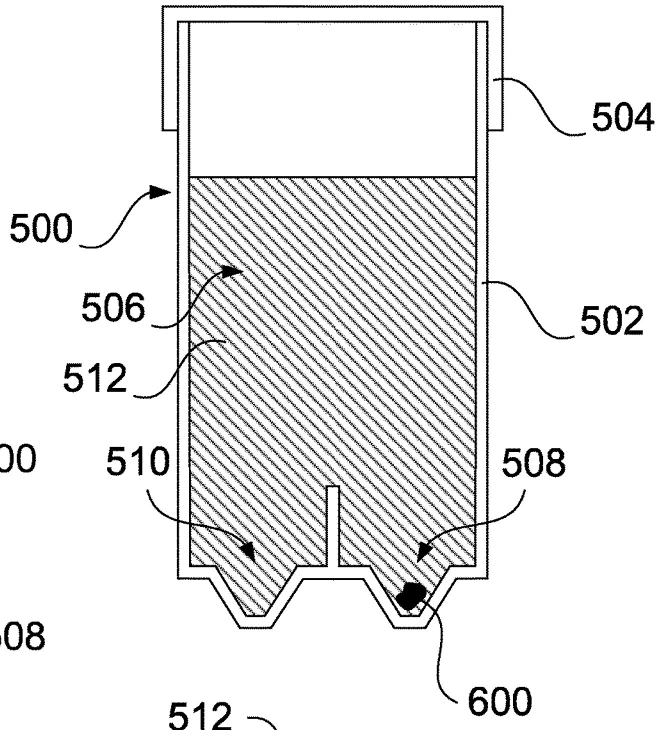
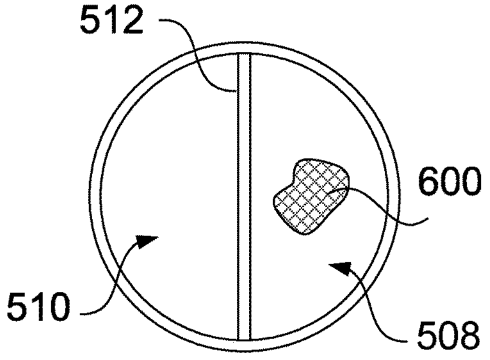
Fig. 2B
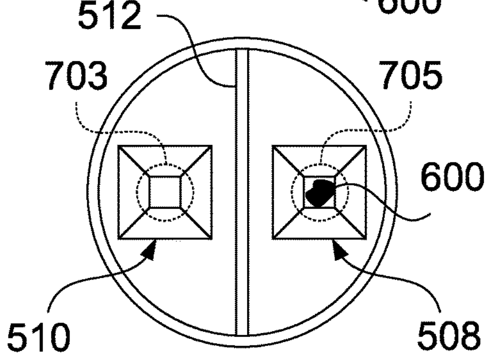
Fig. 3B

METHOD FOR PRODUCING A SECTION RIBBON FROM A SAMPLE BLOCK USING A MICROTOME, METHOD FOR PREPARING A MICROSCOPIC SAMPLE FOR EXAMINATION IN AN ELECTRON MICROSCOPE, MICROTOME AND EMBEDDING MOULD FOR USE THEREIN

CROSS REFERENCE TO RELATED APPLICATIONS

This application is a U.S. National Phase application under 35 U.S.C. § 371 of International Application No. PCT/EP2022/063250, filed on May 17, 2022, and claims benefit to European Patent Application No. EP 21183967.5, filed on Jul. 6, 2021. The International Application was published in English on Jan. 12, 2023 as WO 2023/280458 A1 under PCT Article 21(2).

FIELD

Embodiments of the present invention relate to a method for producing a section ribbon from a sample block using a microtome, a method for preparing a microscopic sample for examination in an electron microscope, a microtome and an embedding mould.

BACKGROUND

In the field of neurosciences, but also in other fields of biology and medicine, the examination of serial sections of tissues, in particular by means of electron microscopy, and the reconstruction of three-dimensional sample information from such serial sections of tissue are important.

SUMMARY

Embodiments of the present invention provide a method for producing a section ribbon from a sample block. The method includes producing a first part ribbon of the section ribbon from a first surface region of the sample block using a microtome comprising a blade. The first part ribbon has one or more first sections of the sample block. The method further includes producing a second part ribbon of the section ribbon from a second surface region of the sample block using the microtome comprising the blade. The second part ribbon has one or more second sections of the sample block. The second surface region is different from the first surface region. The method further includes retracting the sample block from the blade between the producing of the first part ribbon and the producing of the second part ribbon.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 2A and 2B schematically illustrate an embedding mould according to an embodiment of the present invention;

FIGS. 3A to 3C schematically illustrate an embedding mould according to a further embodiment of the present invention;

DETAILED DESCRIPTION

Figure 1:
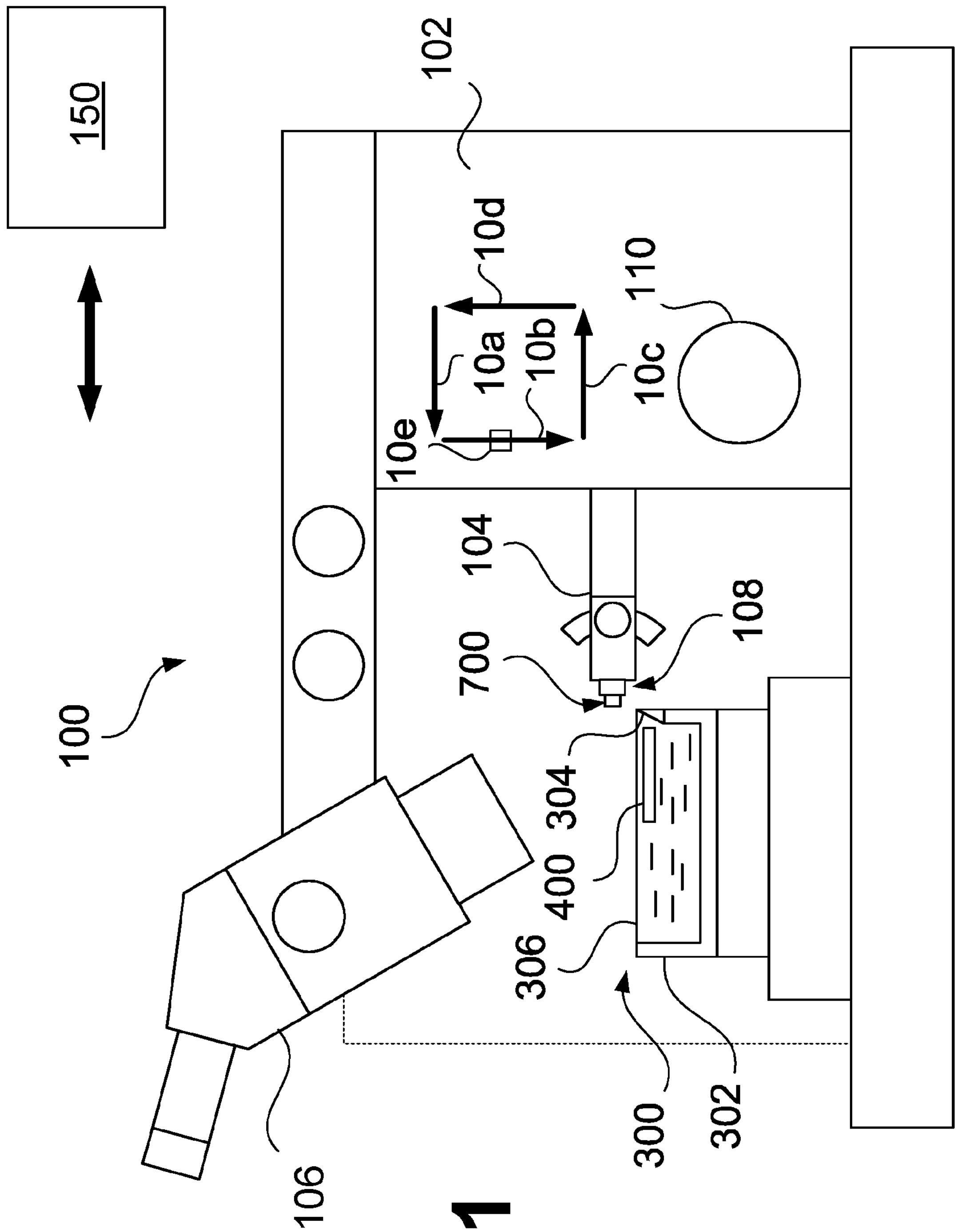
FIG. 1 schematically illustrates a microtome usable according to an embodiment of the present invention.

Methods may include, but are not limited to, so-called “Serial Section Scanning Electron Microscopy” (ssSEM, S3EM) as well as so-called “Serial Section Transmission Electron Microscopy” (ssTEM), wherein embodiments of the present invention can be used in particular in connection with ssSEM. However, it is understood that the embodiments discussed below may also be applied in any other method of a comparable nature. In particular, the present invention can be used in principle in connection with light microscopy instead of electron microscopy, although the explanations below focus on the latter.

In such methods, it may be advantageous, as further explained below, to form section ribbons including, additionally to sections including parts of a sample to be analysed or examined (referred to as “sample sections” herein), so-called “pusher”, “release”, “dummy” or “blank” sections (these terms being used synonymously herein), which may have the sole or essential purpose of extending or elongating the section ribbons and thus pushing the sample sections forward.

Embodiments of the present invention can improve preparing sample ribbons of such a type, in particular on a liquid surface, and in terms of better reliability and user-friendliness.

A method for producing a section ribbon from a sample block using a microtome comprising a blade as provided according to an embodiment of the present invention includes that the section ribbon is produced to comprise a first part ribbon with one or more first sections of the sample block and a second part ribbon with one or more second sections of the sample block, wherein the first part ribbon is produced from a first surface region of the sample block and the second part ribbon is produced from a second surface region of the sample block, the second surface region being different from the first surface region, and wherein the sample block is retracted from the blade between producing the first part ribbon and the second part ribbon. Such a method allows for producing “pusher” sections as indicated above and sample sections in a convenient way from a single sample block and using a microtome comprising a single clamp or holder for a sample block.

According to an embodiment of the present invention, the method further comprises producing the sample block, wherein the first surface region and the second surface region are provided as disjoint surface regions of the sample block. A sample block may thus be specifically prepared to be used in the advantageous method.

In this connection, producing the sample block may comprise providing a precursor sample block comprising joint precursor regions of the first surface region and the second surface region, wherein producing the sample block then comprises trimming the precursor sample block to form the first surface region and the second surface region from the precursor regions. As trimming may generally be useful for providing sample blocks in the field of microscopy, such an embodiment may be advantageous as the first surface region and the second surface region may be provided in a single step in the course of said trimming which is performed anyway.

In an alternative embodiment of the invention producing the sample block may comprise providing the sample block using an embedding mould configured to form the first surface region and the second region or precursor regions thereof as the disjoint regions. Such an embodiment may be advantageous as the surface regions may be (pre-) formed without or with a reduced need of manual trimming.

In the embodiments of the present invention, producing the sample block comprises embedding a microscopic sample in an embedding medium in the embedding mould, such that a comprehensive process including all mutually coordinated method steps required for an advantageous sample preparation is provided.

According to an embodiment of the invention, said embedding mould comprises an undivided inner space, a first compartment and a second compartment, the first compartment and the second compartment extending from and being contiguous with the undivided inner space, wherein the embedding comprises placing said sample into said first compartment but not in said second compartment, filling the first compartment, the second compartment and the undivided inner space at least partially with the embedding medium and curing said embedding medium, wherein the first surface region is a surface region of a part of the sample block cured in said first compartment and wherein the second surface region is a part of the sample block cured in said second compartment. The term "curing" shall refer, in the context used herein, to any type of hardening process including, but not limited, to solidification, cross-linking, polymerisation and crystallisation. In such an embodiment, the sample may be reliably positioned without the risk of an unwanted displacement, e.g. during filling the curing medium into the mould.

In such an embodiment, each of the one or more first sections may include a part of the sample ("sample section" as mentioned above) and each of the one or more second sections may not include a part of the sample ("dummy section"). Again, in such an embodiment a reliable formation or production of "dummy" sections and sample sections is possible with a reduced risk of dislocation of the sample.

In alternative embodiments of the present invention, the method may also comprise producing the sample block, but the first surface region and the second surface region may, in such embodiments, be provided as joint surface regions of the sample block. This obviates the need for trimming or using specifically adapted embedding moulds.

In embodiments of the present invention, the sample block may be repositioned in one or more directions relative to the blade between producing the first part ribbon and the second part ribbon. That is, according to embodiments of the present invention the first and second part ribbons (and their respective sections) are not contiguously cut from the sample block, therefore allowing for any arbitrary order and number of sections or part ribbons.

In an embodiment of the present invention, an ultramicrotome is used as the microtome and the one or more first sections and the one or more second sections are produced as ultrathin sections with dimensions generally known to the skilled person. A corresponding embodiment is advantageous for the methods of transmission or scanning electron microscopy mentioned at the outset and further explained below.

A method for preparing a microscopic sample for examination in an electron microscope is provided according to an embodiment of the present invention as well. The method comprises embedding said sample in an embedding medium producing a sample block and serially sectioning said sample block using a microtome producing a section ribbon, as described before or similarly. Said section ribbon is, in such an embodiment, produced to comprise one or more first sections of the sample block including a part of the sample and one or more second sections of the sample block not including a part of the sample. Said embedding is performed, according to a corresponding embodiment, using an embedding mould comprising an undivided inner space, a first compartment and a second compartment, said first compartment and said second compartment extending from and being contiguous with said undivided inner space. Said embedding comprises placing said sample into said first compartment but not in said second compartment, filling said first compartment, said second compartment and said undivided inner space at least partially with said embedding medium, and curing said embedding medium. Serial sectioning includes, according to the embodiment, forming said one or more first sections from a part of the sample block cured in said first compartment and forming said one or more second sections from a part of the sample block cured in said second compartment. As to the specific advantages of such an embodiment, reference is made to the explanations given above. These advantages include, as mentioned, a reliable positioning of a sample in a mould without the risk of unwanted dislocation.

According to an embodiment of the present invention, said section ribbon is made to float on a liquid surface while being formed by said serial sectioning, said one or more first sections (or the first part sections) being pushed forward on the liquid surface to a target position on the liquid surface by a transfer distance. Said pushing forward comprises forming a plurality of said second sections (and thus a second part section) in said section ribbon in a cumulated length corresponding to said transfer distance after forming said one or more first sections. The method may also be performed in part or completely automatically or on the basis of a user setting in an ultramicrotome. In the method, after a plurality of parallel section ribbons have been formed in a comparable manner, said one or more first sections are fished from the liquid surface using a sample carrier at the target position. The method according to such an embodiment of the invention may therefore be integrated in known workflows including corresponding method steps.

In an embodiment of the present invention, said sample block may be mounted in said microtome such that said part of the sample block formed in said first compartment is initially arranged vertically below and in a common vertical plane with said part of the sample block formed in said second compartment. In such an embodiment, the sample block does advantageously not have to be laterally repositioned between forming the different sections.

By providing the first and second compartments of an embedding mould in different dimensions, as indicated below in more detail and as envisaged according to an embodiment of the present invention, sections comprising different dimensions in a cutting direction may be formed by sectioning said part of the sample block formed in said second compartment, as compared to dissecting said part of the sample block formed in said first compartment. If sections comprising a larger dimension in the cutting direction are formed from the part of the sample block corresponding to the second compartment (or a part of the sample block being void of the sample), this allows for a rapid advancement of the first sections by a relatively lower amount of cutting operations because larger "dummy" sections may be produced.

A microtome configured to perform a method according to any of the preceding claims is provided according to embodiments of the present invention. A microtome comprising a blade and a sample holder and being configured to produce a section ribbon from a sample block received in the sample holder is also provided, wherein the microtome is configured to produce the section ribbon to comprise a first part ribbon with one or more first sections of the sample block and a second part ribbon with one or more second sections of the sample block, wherein the microtome is configured to produce the first part ribbon from a first surface region of the sample block and to produce the second part ribbon from a second surface region of the sample block, the second surface region being different from the first surface region, and wherein the microtome is configured to retract the sample block from the blade between producing the first part ribbon and the second part ribbon. As to further features and advantages of the microtome provided according to embodiments of the present invention, reference is made to the explanations above relating to the method and its embodiments.

In an embodiment, the sample holder of the microtome is configured to receive exactly one sample block. Due to the further configuration of the microtome, a simple construction of a microtome is therefore possible.

In an embodiment, the microtome comprises a control unit, wherein the control unit is configured to provide control commands on the basis of a process definition provided before producing the one or more first sections and the one or more second sections, the process definition including a sequence in which to produce the one or more first sections and the one or more second sections (and thus the first and second part ribbon). This allows for a largely automated production of first and second part ribbons according to a predefined process, on the basis of known dimensions of a water bath on which the section ribbon is to be made to float on.

An embedding mould adapted to be used in a method as discussed in different embodiments above, i.e. a method preparing a microscopic sample for examination in an electron microscope, is also provided herein. The embedding mould comprises an undivided inner space, a first compartment and a second compartment, said first compartment and said second compartment extending from and being contiguous with said undivided inner space. As to further advantages and embodiments in connection with such an embedding mould, reference is also made to the explanations above.

According to an embodiment of the present invention, in the embedding mould, at least a part of said undivided inner space may be cylindrical and may have an inner diameter of 2 to 15 mm, e.g. 5 to 10 mm, in particular about 8 mm. At least the cylindrical space, but also all other parts of the mould, may be surrounded by a wall made of a suitable plastic material, the wall having a thickness of 0.1 to 0.5 mm. The embedding mould may comprise a tear tab and a tear track to liberate a sample block formed in the embedding mould after curing the sample block. This allows for producing and handling the embedding mould in an economic and user-friendly manner.

The embedding mould may, in an embodiment, comprise a flat bottom, wherein said first compartment and said second compartment may at least in part be formed in the form of indentations in said flat bottom. Said indentations may be provided as conical or pyramidal frusta for maximum stability and cutability. In the embedding mould according to embodiments of the present invention, said first compartment and said second compartment may comprise portions divided by dividing structure formed in said embedding mould.

The first and the second compartment may be provided, according to embodiments of the present invention, in different sizes or comprising different cross sections in a common plane, the common plane being perpendicular to a longitudinal axis of the undivided inner space. A line in such a common plane transects the first and the second compartment, wherein a length of said transection between the line and the first compartment is shorter than a length of said transection between the line and the second compartment. Said line corresponds to said vertical direction of cutting in step mentioned above. In such a configuration, therefore, larger (in the sense of an area) or at least longer second or "dummy" sections may be formed and the same cumulative length in the section ribbon may be reached with less cutting operations.

A further advantage of providing the first and the second compartment in different sizes or comprising different cross sections is that blank sections and sections comprising the sample may be easily identified with the naked eye when handling the sample blocks. If the sample is placed into the smaller compartment, a user may later differentiate between blank compartments and sample compartments without optical assistance.

In the Figures, elements of identical function or technical realization are indicated with identical reference numerals and a repeated explanation is omitted for reasons of conciseness only. Explanations relating to device elements may apply for corresponding method steps and vice versa.

FIG. 1 shows a microtome 100 according to an embodiment of the present invention in a simplified side view.

The microtome 100 can be designed in particular as an ultramicrotome, which is the case in the example illustrated, and an operation of the microtome 100 may be controlled using a control unit 150 of any type known in the art. Control unit 150 may be provided as a computing and evaluation unit, which is connected to the ultramicrotome 100 via a wired or wireless communication link as indicated by a bidirectional arrow. Other than explicitly shown, the control unit 150 can also be accommodated in the microtome 100 or a housing thereof or in a personal computer system or a workstation.

The ultramicrotome 100 comprises a sample holder 108 attached to a sample arm 104 with which a sample block 700 attached to the sample arm 104 can be moved as illustrated with arrows 10*a* to 10*d* to cut a sample in a "cutting window" 10*e*. Cutting in the ultramicrotome 100 may comprise advancing the sample block 700 towards a blade 304 of the ultramicrotome 100 in the horizontal direction 10*a* illustrated, moving the sample block vertically downwards in a direction 10*b* orthogonal to a blade edge of said blade 304, thereafter retracting the sample block in a horizontal direction 10*c*, and moving the sample block upwards in a direction 10*d* to be able to restart the process. The movement operations together form a "rocking" movement, and the advancement and retraction in steps and is performed in an amount avoiding collisions wherein advancement according to 10*a* additionally comprises an advancement in an amount corresponding to the desired section thickness.

According to embodiments of the present invention, which includes producing first and second part ribbons as explained above and further illustrated below, the sample block 700 is retracted between producing the first part ribbon and the second part ribbon, and optionally each of the sections thereof, whereby any order and number of first and second sections or part ribbons of arbitrary length and order may be produced. This is an essential advantage of embodiments of the present invention over methods according to the prior art such as disclosed in US 2015/0135917 A1 where "sample" and "dummy" sections, if produced from the same sample block such as from sample block 904 in US 2015/0135917 A1, are always cut in a single cutting operation without retraction, and therefore contiguously, such that a fixed order of "sample" and "dummy" sections is mandatory.

The downward movement according to 10*b* is, as further explained below, preferably performed in different speeds, wherein the sample block 700, in a first phase of the downward movement, relatively quickly approaches the blade 304, the sample block 700 is thereafter, in a second phase, cut in a desired slower cutting speed, and thereafter again moves away from the blade 304 in a third phase in a speed again larger than the cutting speed.

The sample arm 104 is connected to a movement unit integrated into a housing 102 which may be known per se and is therefore not discussed in further detail. Manual adjustments or an operation of the ultramicrotome 100 may be performed using a handle 110 and other handles not individually labelled. An operation of the ultramicrotome 100, i.e. a formation of sections, may be observed using an observation microscope 106.

A blade unit 300 is shown in a greatly enlarged manner and illustrated in a lateral sectional view. Using the blade 304 of the blade unit 300, ultrathin sections are produced in each cycle illustrated by arrows 10*a* to 10*d*. As explained in further detail with reference to the following figures, sections produced accordingly adhere to each other, forming a section ribbon, which is made to float on a liquid surface 306 formed in a liquid trough 302 which also holds the blade 304. A transfer element 400 is submerged in the liquid and may be lifted to "fish" the section ribbons from the liquid trough 302 and transfer them to an electron microscope.

The ultramicrotome 100 can comprise a cooling chamber illustrated with a dotted line in FIG. 1 and any other devices, for example lighting devices, temperature control devices and the like, as generally known from the prior art.

The ultramicrotome 100 may be used to produce section ribbons for use in ssSEM, as mentioned at the outset and as described in further detail for example in Horstmann, H. et al, Serial Section Scanning Electron Microscopy (S3EM) on Silicon Wafers for Ultra-Structural Volume Imaging of Cells and Tissues. PLOS ONE 7(4), 2012, e35172, i.e. a high-resolution, three-dimensional (3D) imaging of cellular ultrastructure can be performed on the basis of the sections. In contrast to ssTEM, see below, which allows examination of limited subcellular volumes but rarely a complete ultrastructural reconstruction of large volumes, whole cells, or whole tissues, this is possible using ssSEM. However, embodiments of the present invention are not limited to either ssTEM or ssSEM, as already mentioned at the outset.

In ssSEM, as the name says, serial sectioning of tissues is combined with scanning electron microscopy (SEM), especially using a conductive wafer as a support. In ssSEM, section ribbons with up to hundreds of sections with a thickness of, for example, 35 nm can be generated using an ultramicrotome 100 as illustrated and may thereafter be imaged on the wafer to which they are transferred with a transfer element such as transfer element 400 illustrated in FIG. 1 with a lateral pixel resolution of, for example, 3.7 nm. In ssSEM, electrons backscattered from the sections are typically recorded with a detector in the objective of the SEM ("in-lens detector"). The images resulting from such a method are qualitatively comparable to those of a conventional TEM. The main advantage of ssSEM is, as mentioned, that it can be used to reconstruct comparatively large structures, for example in the two- to three-digit cubic micrometer range.

The method of ssTEM is described, for example, in Harris, K. M. et al, Uniform Serial Sectioning for Transmission Electron Microscopy, J. Neurosci. 26(47), 2006, 12101-12103. Despite representing a more conventional method, ssTEM may be superior to other methods for reconstructing three-dimensional sample information such as confocal microscopy, especially because of its high resolution.

A sample is prepared for methods such as ssSEM and ssTEM in a known manner for processing and is embedded, for example, in agarose or suitable plastics to form the sample block 700. From the embedded sample, section ribbons are created using an ultramicrotome such as the ultramicrotome 100 as illustrated in FIG. 1 by adjusting a suitable feed rate, with individual sections adhering to each other in such ribbons, "adhering" referring to a relatively weak connection at the edges of the sections but no contiguous material connection. The section ribbons generated in this way are allowed to float, while initially still being attached to the blade, in a liquid bath and are removed ("fished") therefrom by means of suitable transfer devices (so-called slot grids or, in the case of ssSEM, wafers) for further examination, as schematically illustrated with the transfer element 400 in FIG. 1. It is also possible not to let the generated section ribbons float on a liquid bath, but to transfer them directly to a suitable carrier or transfer element, for example a wafer.

The position of a single section in the examined object corresponds to its position in a generated section ribbon and vice versa. Therefore, in corresponding procedures it is of great importance to generate section ribbons that are uninterrupted and as long as possible, in order to be able to indicate the position of the individual sections in the overall sample in this way, or in which preferably all sections can be imaged without some being lost for whatsoever reasons. However, this cannot always be ensured, for example with certain embedding materials. For long section ribbons, correspondingly long liquid baths or transfer devices are required and the handling of the cuts becomes more difficult. In addition, the targeted generation of section ribbons typically proves to be not unproblematic in practice and requires skill and prolonged training.

One way to create multiple section ribbons, when using a liquid bath, is to use a manipulation tool (classically an eyelash) to separate the currently adhering section ribbon from the microtome blade after each desired number of sections and direct it to an area of the liquid bath where it will not interfere with the cutting of a subsequent ribbon. When a sufficient number of section ribbons have been produced in this manner, the transfer device is slowly lifted upwards and out of the liquid. The liquid is allowed to run off, resulting in the section ribbons adhering to the transfer device. Typically, up to approximately 200 sections can be produced in this manner. If no liquid bath is used, the explanations apply accordingly.

A disadvantage in a corresponding process is that the sections of a section ribbon often do not adhere reliably to each other, when manipulated by an operator. Therefore, for example, ribbon parts can drift apart on the liquid surface so that they can subsequently no longer be assigned to the cutting sequence. In addition, a bending of corresponding section ribbons can often be observed, due to which they abut on edge structures or other ribbons. As a result, the resulting fragments may tear and drift apart. If section ribbons or their fragments abut the liquid boundary, when a liquid bath is used, they cannot be deposited reliably on the transfer device, or at all, but continue to adhere preferentially to the liquid boundary. Thus, sections may be lost. A further disadvantage is that only a low degree of filling of the transfer device can be achieved in the manner explained. This is typically at most 10%, so that frequent transfers are required in corresponding processes. In addition, manipulations with a manipulation tool are risky, since the ribbons can be damaged. In particular, ruptures and/or holes or wrinkles may occur.

An alternative method described e.g. in US 2015/0135917 A1 is to form one or a plurality of section ribbons of which the last section produced still adheres to the blade of the microtome while sections previously produced float, as a part of the section ribbon, on the liquid surface and are gradually pushed forward and away from the blade as new sections are continuously added to, and therefore elongating, the ribbon.

In this way, when several parallel section ribbons are formed, up to 300 sections can be produced. In this context, the section ribbons are lifted out of the liquid using a suitable transfer device as also described in in US 2015/0135917 A1. As, however, such transfer devices comprise a peripheral area which cannot be used for later observation, sections placed on the peripheral area are lost to further examination and only section positioned closer to the centre are usable. In other words, it is necessary to position the sections of interest at a certain distance from the blade, in order to be able to analyse them in a later step. This is typically realized, as already mentioned at the outset as well, by the use of so-called “pusher”, “release”, “dummy” or “blank” sections (these terms being used synonymously herein), which only have the purpose of extending the section ribbons and thus pushing the sections of interest into the central area of the transfer device.

As such release sections would otherwise consume valuable sample material they are typically formed from a part of a sample block not comprising a sample or a valuable part thereof. The blank sections used accordingly are lost to the actual examination as they lie outside a transfer device or a wafer, or an observable region thereof. If release sections were taken from regions including the sample, the generation of release sections would not allow a continuous section generation over larger sample areas, since the series of sections of interest would be repeatedly interrupted by the release sections required for positioning which would be missing in the subsequent examination. An embodiment of the present invention provides advantages over methods according to the prior art as it proposes to produce sample and “pusher” sections from the same sample block, forming first and second part ribbons each including at least one sample or pusher section, respectively, but also allows for producing first and second sections or part ribbons in any desired order and independently from each other because the sample is retracted from the blade between, as mentioned.

In more general language, as used before a section ribbon may be produced in embodiments of the present invention to comprise a first part ribbon with one or more first sections of the sample block and a second part ribbon with one or more second sections of the sample block, wherein the first or second sections may be void of sample and therefore may be used as the “pusher” sections. In embodiments of the present invention, the first part ribbon is produced from a first surface region of the sample block and the second part ribbon is produced from a second surface region of the sample block, the second surface region being different from the first surface region. As explained below, the first and second surface regions may be may be surface regions of parts of a sample block formed in different compartments of an embedding mould, but they may also be formed from a common precursor surface region by trimming. In contrast to such embodiments where the first and second surface regions are disjoint (either by producing them in a correspondingly adapted mould or by trimming) the surface regions may, in a yet further embodiment of the present invention, also be joint regions which are repositioned vis-à-vis a blade of a microtome. The description will now turn to the former alternative, i.e. a method in which the first and second surface regions are disjoint as they are produced in a suitable mould.

Figure 3C:
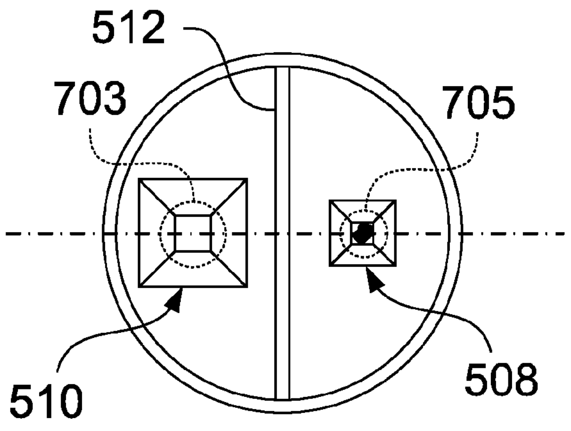

In FIGS. 2A and 2B, as well as in FIGS. 3A to 3C, embedding moulds 500 according to specific embodiments of the present invention are shown in longitudinal views (FIGS. 2A and 3A) and bottom views (FIGS. 2B, 3B and 3C). In both cases, the embedding moulds 500 comprise an essentially cylindrical common inner space 506 surrounded by a wall 502 and optionally covered by a lid 504. From the inner space 506, compartments 508 and 510 extend, which are contiguous with the inner space 506. The inner space 506 and the compartments 508, 510 may be filled with an embedding medium 512 which may be made to cure in the embedding moulds 500. The compartments 508, 510 may be further divided with a dividing element 509, but this is not a prerequisite in embodiments of the invention, those illustrated in FIGS. 3A to 3C.

While there are a large number of commercially available embedding moulds, which generally can be used in the methods as described hereinbefore, these conventional embedding moulds suffer from specific disadvantages if compared to embedding moulds 500 according to embodiments of the present invention. Embedding moulds according to the prior art generally are of a cylindrical shape and sometimes comprise a tapered tip, in order to reduce further preparation work, i.e. the amount of material to be trimmed off. Embedding of a microscopic sample in an embedding mould of this kind, however, essentially as in embodiments of the present invention, comprises placing the sample into the inner space of the embedding mould, filling said inner space with an embedding medium of a suitable type, which is in the field with which the present invention is concerned a so-called “ribboning” embedding medium like a polyester wax or an epoxy material, and curing said embedding medium in the mould, thereby forming a “sample block” such as the sample block 700 shown in FIG. 1. According to embodiments of the present invention, such a sample block may be provided with disjoint surface regions in order to allow for independent cutting operations in any order and number at each of the surface regions of the sample block 700 independently.

After removing the sample block 700 from the mould, for which process step the mould may comprise defined breaking points or tearing strips, the sample block 700 formed may be, in methods according to the prior art and according to embodiments of the present invention, subjected to "trimming" step in which superfluous embedding medium may be removed in order to adapt the cutting area to the size of an ultramicrotome blade. Trimming work may be reduced by using tapered embedding moulds, i.e. embedding moulds comprising "tips" in which the sample may be placed, which may then be surrounded by a smaller amount of embedding medium to be cut away. Multi-well embedding moulds, partially resembling multi-well sample plates, are also known. They comprise a plurality of individual embedding moulds as described hereinbefore in a common carrier with which they may be integrally formed or into which they may be inserted.

None of the embedding moulds according to the prior art, however, allow for a clear local separation of the specimen from regions from which blank sections for positioning may be produced. Essentially, the currently available moulds are designed in such a way that the sample material is positioned at a largely undefined position, which may be in the centre or in the periphery of the inner space of the embedding mould. In other words, the sample is not restricted to certain regions in sample moulds according to the prior art and an operator has no possibility define regions to in advance from which he or she can form sample sections on the one hand and blank sections on the other hand. This may significantly complicate the formation of blank sections for positioning.

US 2015/0135917 A1, which was already mentioned above, discloses the formation of blank sections from embedding material void of a sample. In a first embodiment, different sample blocks are used, one of which containing the sample and the other being completely void of the sample, and in a second embodiment, a region of a single sample block is kept void of the sample such that such a region, when sectioned, produces a blank section. The first embodiment, however, requires the ultramicrotome to be capable to hold several sample blocks and in the second embodiment, positioning of the sample material is often cumbersome as there is no structural separation of different regions and material can still move out of the desired position. Moreover, according to such a conventional method, the order of "sample" and "dummy" sections is strongly restricted to be alternating when these are produced from a single block. Both problems may be overcome by using the embedding moulds provided according to embodiments the present invention and the methods according to embodiments of the present invention in which they are used.

As shown in FIGS. 2A and 2B, the compartments 508, 510 may be formed as two halves of a divided tip of the embedding mould 500 while, as shown in FIGS. 3A, 3B and 3C, they also may be formed as truncated pyramid (pyramidal frusta) extending from a bottom of the embedding mould 500. A sample 600 is placed in a first compartment 508 of the compartments 508, 510 while a second compartment 510 of the compartments 508, 510 is left empty, i.e. is only filled with embedding medium 512. First and second surface regions provided by said frusta are encircled with a dotted line (being no structural feature) and indicated 703 and 705.

As shown in FIG. 3C, the compartments 508, 510 may be provided in different sizes or comprising different cross sections in a common plane corresponding to the paper plane. A line in said a common plane or parallel to the paper plane, which is illustrated as a dash-dotted line here, transects the first and the second compartment 508, 510 such that a length of said transects in the first compartment 508 is shorter than a length of said transects in the second compartment 510. When, as shown hereinbelow, a sample block formed in the embedding mould 500 is sectioned in a direction corresponding to said line, larger sections without parts of the sample 600 and smaller sections including parts of the sample 600 may be formed. Again, first and second surface regions provided by the differently sized frusta are encircled with a dotted line (being no structural feature) and indicated 703 and 705. They are likewise provided in different sizes in the example illustrated.

In corresponding embodiments of the present invention, therefore, an embedding mould 500 in which sample material and blank material are kept separate by technical means, i.e. a material barrier between separate compartments or receptacles, or in which individual protrusions are provided, is used. Thus, a predefined position of the sample and the blank is present and the basic condition necessary for the automatic section ribbon production, for 3D TEM examinations, i.e. separate sample and blank sections, is fulfilled. With the embedding mould used according to the present invention, the loss of non-usable sample material for the production of automatic serial sections for 3D TEM reconstruction, i.e. for sections which are used for positioning only, is significantly reduced.

The basic idea of using the embedding mould 500 according to such an embodiment of the present invention is to position the sample in a separate or defined receptacle, which is locally separated from a receptacle for a second specimen or just empty embedding material. Generally, therefore, if reference is made to "one" first compartment or "one" second compartment, at least one further compartment resembling and having the purpose of the first compartment and at least one further compartment resembling and having the purpose of the second compartment may be present.

A significant advantage of the using a mould 500 as explained, as compared to forming several different sample blocks as in the prior art, e.g. in the corresponding embodiment of US 2015/0135917 A1, is that producing and using only one sample block 700 reduces preparation and mounting time and correspondingly improves user friendliness, reliability and reproducibility. As mentioned, in contrast to the prior art the sample may be more reliably positioned according to embodiments of the present invention as a mechanical barrier between compartments is present in the embedding mould 500.

Be it noted, however, that further embodiments of the present invention may include using different, and conventional, types of embedding moulds wherein no different compartments are provided, as mentioned. In such embodiments, a "precursor" sample block may be provided in which sample and blank regions are not yet physically separated, i.e. wherein the surface regions from which the different sections are ultimately produced as joint precursor regions. In such cases, producing a sample block may comprise trimming the precursor sample block to form the surface regions from which the sections are taken. A shape of the sample block as a result of said trimming may correspond to that of a sample block formed with a comparted mould. When the surface regions from which the sections are produced are, in yet further embodiments of the present invention, provided as joint surface regions of the sample block, they may be positioned side-by-side to each other, in parallel with an edge of the blade, and sections may be formed therefrom by laterally repositioning the blade.

Figure 4A:
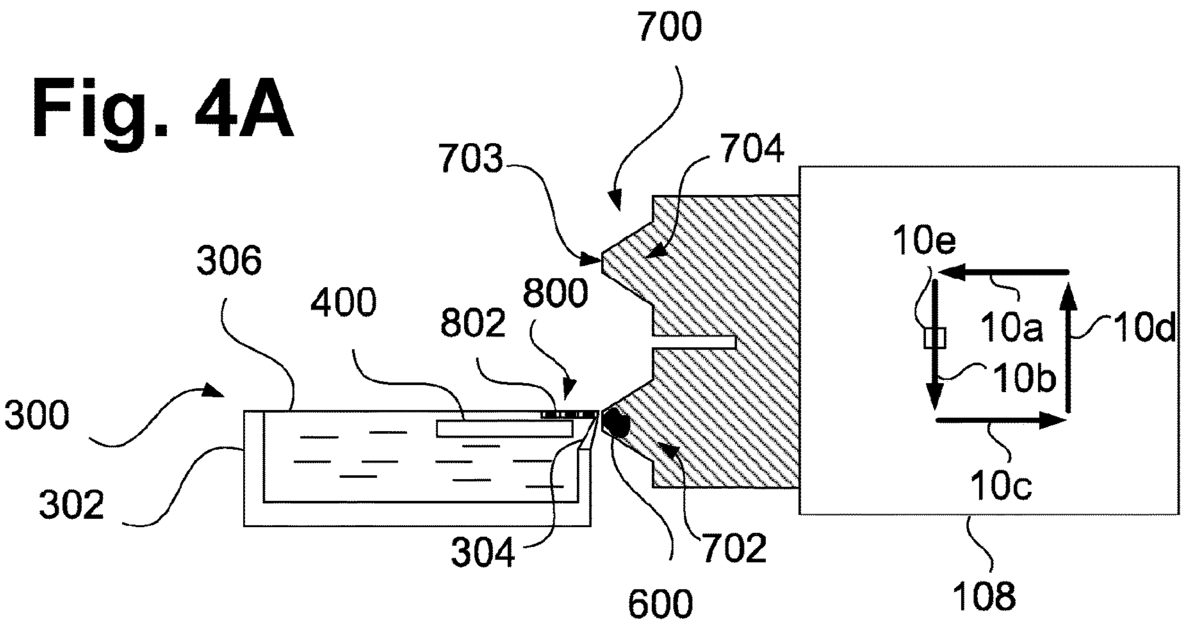
FIGS. 4A to 4D schematically illustrate method steps of a method according to an embodiment of the present invention.
Figure 4B:
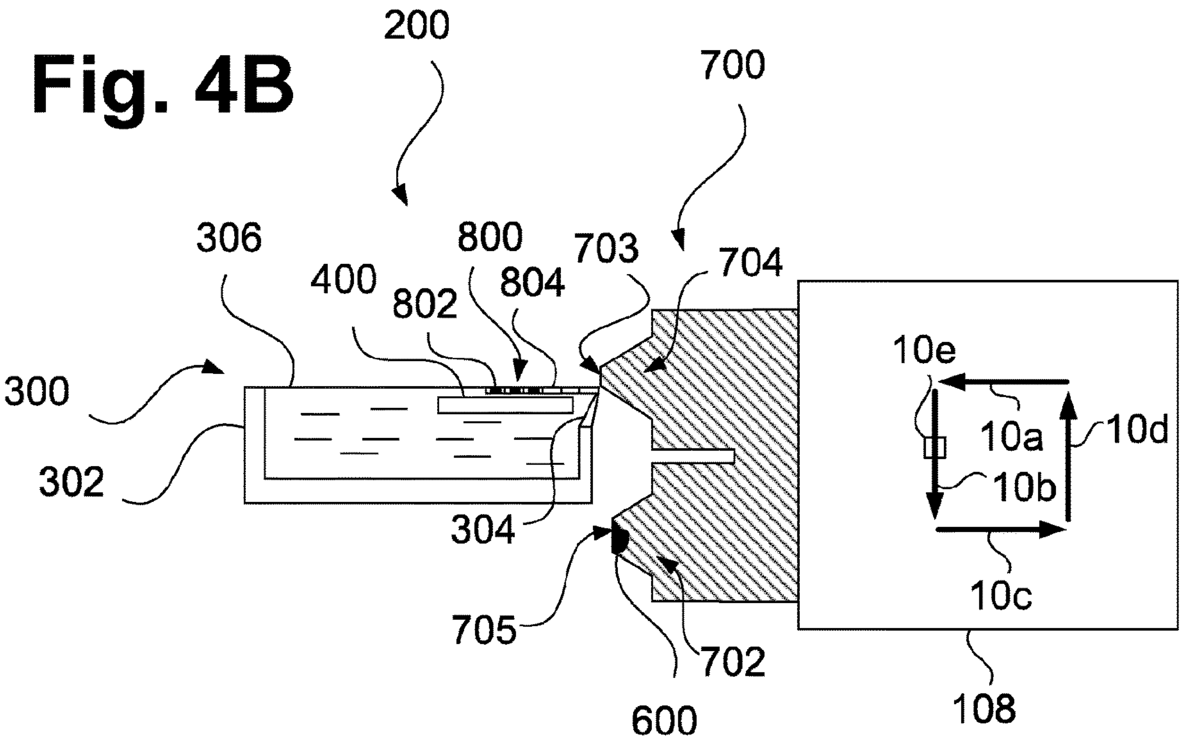
Figure 4C:
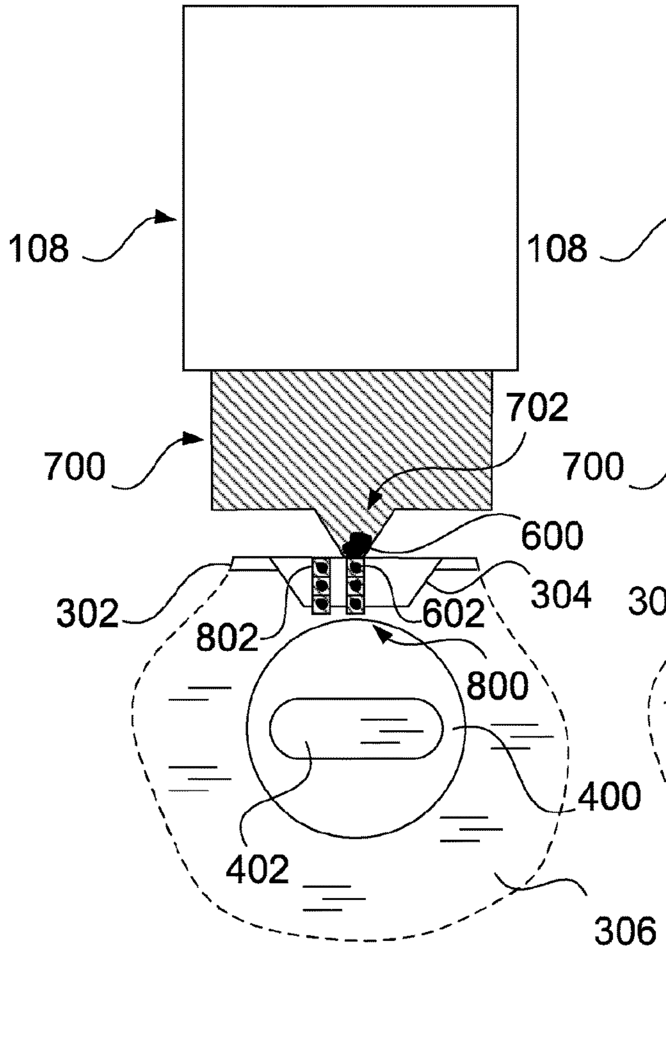
Figure 4D:
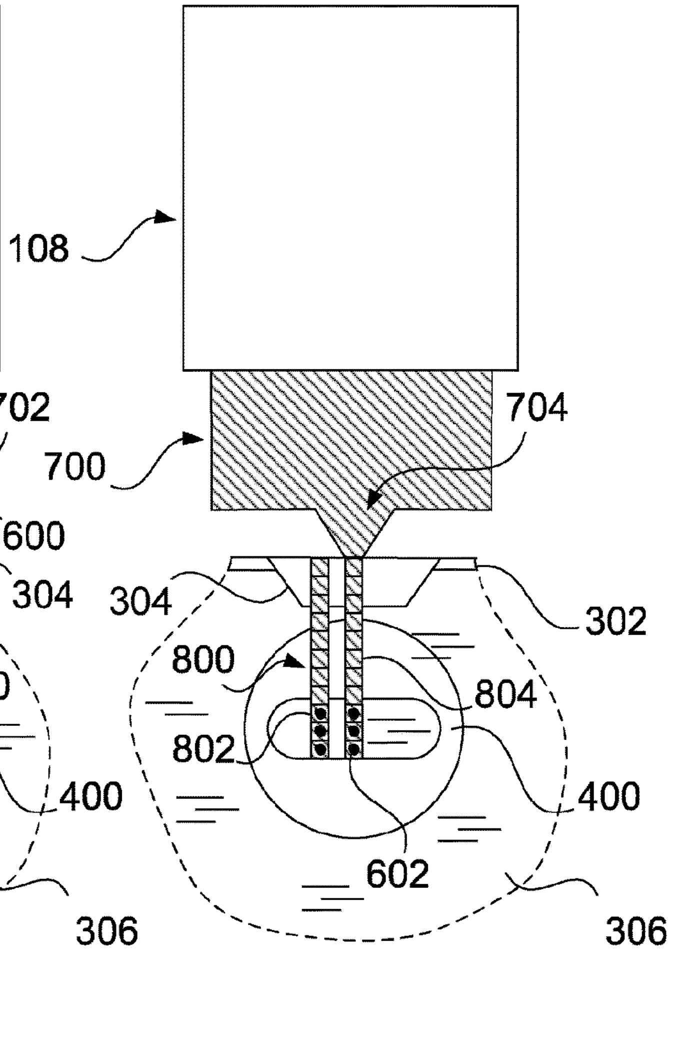

Turning again to embedding moulds 500 with compartments, such as provided according to embodiments of the present invention, by curing the embedding medium 512 in the embedding mould 500, a sample block 700 is formed, as shown in FIGS. 4A to 4D where the sample block 700 may be produced using an embedding mould as shown in FIGS. 3A and 3B. FIGS. 4A to 4D, furthermore, illustrate method steps of a method according to an embodiment of the present invention, wherein FIGS. 4A and 4B show side views corresponding to that of FIG. 1 and FIGS. 4C and 4D show bird's-eye views from a position above the ultramicrotome 100 shown in FIG. 1 along a longitudinal direction of the ultramicrotome 100 and rotated by 90°. Neither of the views and the elements shown therein is drawn to scale. This relates to the sections whose thickness is greatly exaggerated for reasons of clarity. The movements already shown and discussed in connection with FIG. 1 are again shown here and illustrated with arrows 10*a* to 10*d* and the cutting window 10*e* in FIGS. 4A and 4B.

As shown in FIG. 4A, by moving the sample holder 108 as discussed and as illustrated with the arrows 10*a* to 10*d*, sections 802 may be formed from a part 702 of the sample block 700 corresponding to the first compartment 508 containing the sample 600. Therefore, each of these sections 802, which were referred to as "first" sections before, contains a part of the sample 600. A section ribbon formed accordingly, which initially only comprises "first" sections 802 according to FIG. 4A, i.e. sections 802 comprising parts of the sample 600, is indicated 800 and was previously referred to as "first part section". By a relative lateral movement between the sample block 700 and the blade 700 between sectioning, several section ribbons 800 may be formed which parallelly adhere to the blade 304 and are each formed as discussed.

After forming a plurality of first sections, the part 702 of the sample block 700 corresponding to the first compartment 508 containing the sample 600 is substantially shortened, as illustrated in FIG. 4B in an exaggerated manner. In consequence, the part 704 of the sample corresponding to the second compartment 510 in which no sample is present, is accessible to the blade. That is, the parts 702 and 704 are, in this example, initially of the same size and the part 702 is shortened by producing sections. However, this embodiment may also be used in connection with sample block parts of different sizes, such as shown in FIG. 3C. As shown in FIG. 4B, by moving the sample holder 108 as discussed and as illustrated with the arrows 10*a* to 10*d*, sections 804 may therefore now be formed from a part 704 of the sample block 700 corresponding to the second compartment 510 not containing the sample 600. Therefore, each of these sections 804, which were referred to as "second" sections before, and forming a "second part section" may be used to position sections 802 containing parts of the sample. The section ribbon 800 is thus elongated from the side of the blade 304 by second sections 804 and thus the sections 802 may be positioned on a transfer element 400. Again, by a relative lateral movement between the sample block 700 and the blade 700 between sectioning, several section ribbons 800 may be elongated accordingly which parallelly adhere to the blade 304.

Forming two section ribbons 800 containing first and second sections 802, 804, the former containing parts 602 of the sample 600, is again shown in FIGS. 4C and 4D in a bird's-eye view, where the parts 702 and 704 of the sample block are shown as if the respective other part 704, 702 was not present for reasons of simplification. Not all identical elements are indicated with reference numerals. As shown, by elongating section ribbons 800 with second sections 804, i.e. by forming second part sections the first sections 802 in a first part section may be positioned to correspond to a window 402 of the transfer element 400.

In embodiments of the present invention in which embedding moulds 500 comprising a first compartment 508 and a second compartment 510 are used, forming one or more first sections 802 or a corresponding first part ribbon is preceded by positioning the part 702 of the sample block 700 formed in the first compartment 508 to be cuttable by a blade 304 of the microtome 100 used and forming the one or more second sections 804 or a corresponding second part ribbon is preceded by positioning the part 704 of the sample block 700 formed in the second compartment 510 to be cuttable by the blade 304 of the microtome 100. Forming sections, in each case, and as illustrated in FIGS. 4A to 4D comprises horizontally advancing the sample block 700 towards the blade 304 of the microtome 100, moving the sample block 700 vertically downwards in a direction orthogonal to a blade edge of said blade 304, thereafter retracting the sample block 700 in said horizontal direction, and moving the sample block 700 upwards to be able to restart the process at step, wherein steps to together form a "rocking" movement. Retracting is done between forming the first and second part ribbons which each have an arbitrary number of first and second sections 802, 804. Essentially the same applies if trimming is performed to produce disjoint surface regions 703, 705.

The advancement and retraction as illustrated with arrows 10*a* and 10*c* is performed in an amount avoiding collisions of parts of the sample carrier 108 or the sample block 700 with the blade 304 and other parts of the microtome 100 and is performed over a large distance, wherein the advancement 10*a* additionally comprises an advancement in an amount corresponding to the desired section thickness. The downward movement as illustrated with arrow 10*e* is preferably performed in different speeds during the course of the movement, such that the sample block, in a first phase of the downward movement, relatively quickly approaches the blade 304, the block 700 is thereafter, in a second phase, cut in a desired slower cutting speed such as 1 mm/s, and the sample block 700, after each actual cut, moves away from the blade in a third phase of the movement in a speed again larger than the cutting speed.

In the embodiments of the present inventions, the movements as illustrated with arrows 10*a* to 10*c* may each cover a certain movement range, wherein the movements illustrated with arrows 10*b* and 10*d* may cover a range of 0.1 mm to 5 mm, preferably 0.2 to 2 mm and the movements illustrated with arrows 10*a* and 10*c* may cover a range of 0.1 mm to 0.5 mm, preferably 0.2 to 0.3 mm.

Both parts 702, 704 of the sample block, independently from whether they are formed in compartments 508, 510 of a sample mould 500 or by trimming, may, in this connection, initially be cut, using the microtome 100, to a common length. Thereafter, first sections 802 of one or more section ribbons 800 and therefore a first part ribbon may be formed. That is, at a first lateral position of the blade 304 relatively to the sample block 700, first sections 802 of a first ribbon 800 may be formed, and the lateral position of the blade 304 relatively to the sample block 700 may then be changed such that first sections 802 of a second section ribbon 800 and therefore a further first part ribbon may be formed. The first sections 802 of the first and the second section ribbons 800 both adhere to the edge of the blade 304 and parallel extend therefrom. Additional section ribbons 800 including first sections 802 and therefore first part ribbons may be formed in this manner. Changing the relative positions between the blade 304 and the sample block 700 may include moving the blade 304 or a structure carrying the blade, the sample block 700, or both, in a direction essentially parallel with, or corresponding to, the edge of the blade 304.

Absolute and/or relative spatial indications used at any point of the present disclosure, such as indications like "above", "below" and "besides", in particular refer to the spatial arrangement of the elements correspondingly designated, for example parts 702, 704 or surface regions 703, 705 of a sample block 700. By an arrangement of two elements wherein one element is arranged "below the other" is understood in particular that the upper end of the lower of the two elements is at a lower or the same geodetic height as the lower end of the upper of the two elements and that the projections of the two elements on a horizontal plane overlap.

After one or a number of section ribbons 800, or ribbon parts, each including first sections 802 only, has been formed, the part of the sample block 702 formed in said first compartment 502 or trimmed accordingly and including the sample is shortened by an amount corresponding to a cumulative thickness of the first sections 802 in said horizontal direction, and may optionally be further shortened. Therefore, the part 704 of the sample block 700 formed in said second compartment 510 is accessible to the blade 703 and may be brought into a cutting position. The, or each of the, section ribbons 800 may therefore be elongated by forming second sections 804, i.e. second part ribbons or, in other words, attaching second sections 804 to the beginning of the section ribbons 800 previously comprising the first sections 802 only.

In an ultra-microtome, which may be used according to the present invention, therefore, the parts of the sample block formed in the first and second compartment may be arranged vertically above each other. In other words, said sample block is mounted in said microtome such that said part of the sample block formed in said first compartment is initially arranged vertically below and in a common vertical plane with said part of the sample block formed in said second compartment.

Be it noted, however, that the method just mentioned, including a specific arrangement of the parts of the sample block above each other, only represents one of several embodiments of the present invention. In a further embodiment, for example, an ultra-microtome blade, which is mounted in a distance to the liquid reservoir or at an angle thereto, may be used, in order to provide a certain distance between the sample block and its parts and the reservoir.

Figure 5A:
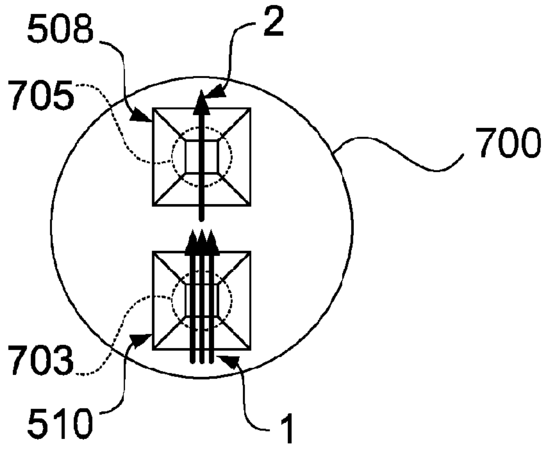
FIGS. 5A to 5C schematically illustrate cutting operations in methods according to different embodiments of the present invention.
Figure 5B:
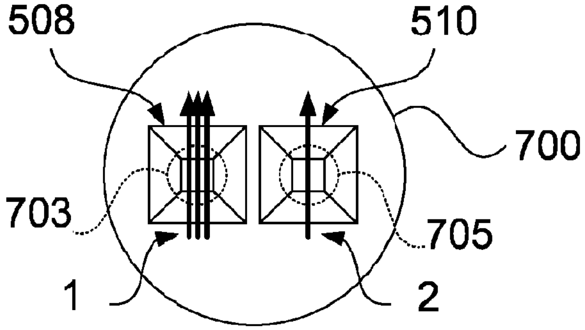
Figure 5C:
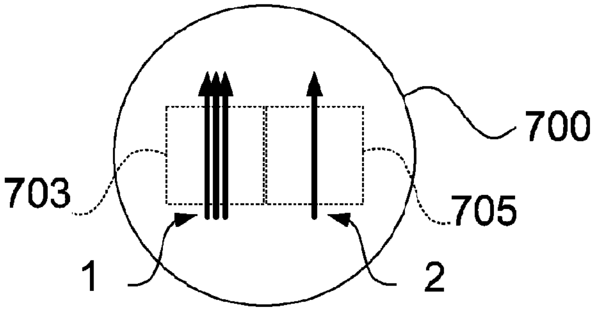
Figure 6:
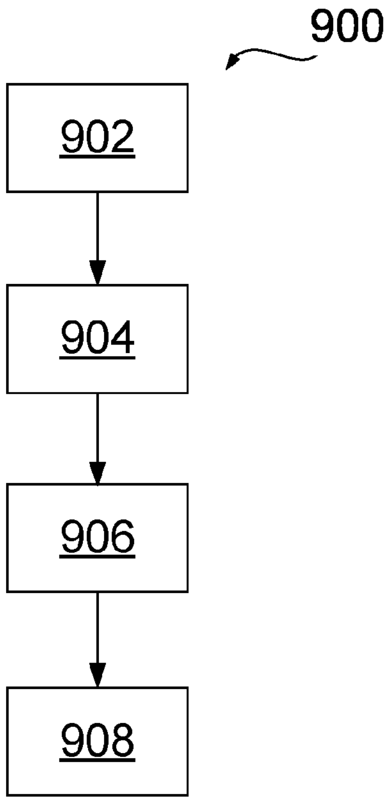
FIG. 6 schematically illustrates a method according to an embodiment of the present invention in a procedural plan.
Figure 7:
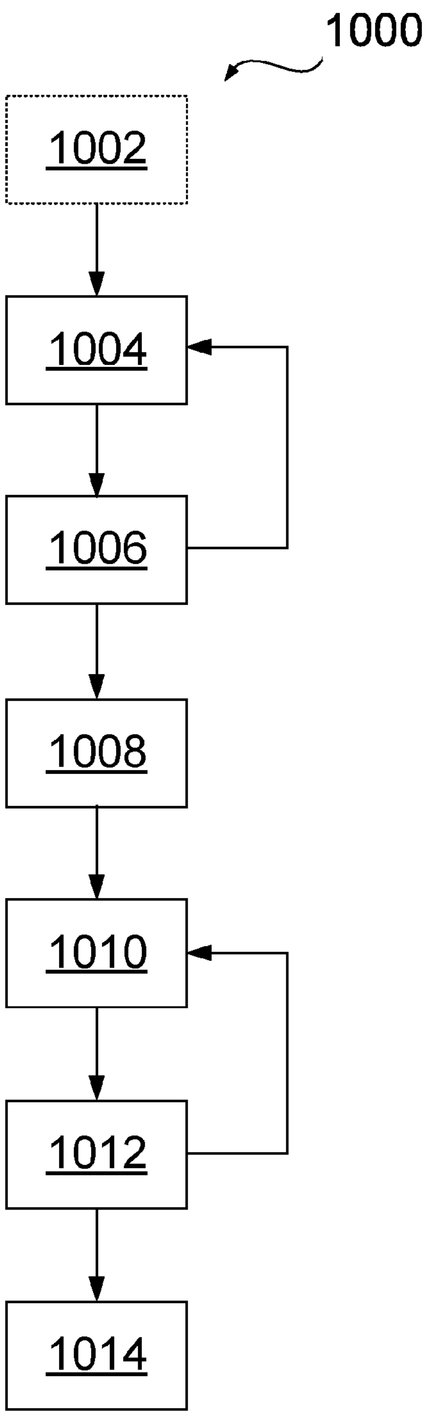
FIG. 7 schematically illustrates a method according to an embodiment of the present invention in a procedural plan.

FIGS. 5A to 5C illustrate cutting operations performed with a sample block 700 according to embodiments of the present invention, wherein individual cuts are illustrated with arrows 1 and 2 and the sample blocks 700 are viewed from a direction of the blade 304, such as in FIGS. 2B, 3B and 3D. As to the reference numerals used in FIGS. 5A to 5C, reference is therefore made to FIGS. 2B, 3B and 3D.

In the examples shown in FIGS. 5A to 5C, three cutting operations 1 are performed in a first surface region 703 of the sample block 700 and one cutting operation 2 is performed in a second surface region 705 of the sample block 700, but these numbers may vary in any manner considered useful for forming "sample" and "dummy" sections (first and second sections and first and second part ribbons). For example, the surface region 703 may include a part of a sample 600 and the surface region 705 may be void of a part of the sample or vice versa, such that, in embodiments of the present invention. either of the surface regions 703, 705 may be cut to produce "sample" and "dummy" sections in part ribbons in any number and order, which is a particular advantage of the present invention.

That is, a first part ribbon including "first" or "sample" sections 802 may be produced from either of the surface regions 703, 705 (which may then be referred to as a "first" surface region) of the sample block 700 and a second part ribbon including "second" or "dummy" sections 804 may be produced from the other surface region 703, 705 (which may then be referred to as a "second" surface region).

As was already illustrated in FIGS. 4A to 4D, in principle resembling FIG. 5A, disjoint surface regions 703, 705 are cut with the blade 304 of the microtome 100 to form the first and second sections 802, 804, and these surface regions 703, 705 are arranged vertically above one another, i.e. along a line transversal to a direction of the edge of the blade 304 which is horizontal in the illustrations of FIGS. 5A to 5C. As illustrated in FIG. 5A, first three sections are produced from surface region 703 using cutting operations 1 and thereafter one section is produced from surface region 705 using a cutting operation 2. At least between the cutting operations 1 and 2, i.e. between producing the respective sections or part ribbons from the surface regions, the sample block 700 is retracted from the blade 304. Therefore, the order of forming first and second sections, and their number, is freely selectable according to embodiments of the present invention.

In FIG. 5B, cutting according to an alternative embodiment of the invention is schematically illustrated. Again, disjoint surface regions 703, 705 are cut with the blade 304 of the microtome 100 to form the first and second sections 802, 804, but according to FIG. 5B, these surface regions 703, 705 are arranged side-by-side to one another, i.e. along a line parallel to a direction of the edge of the blade 304 which is horizontal in the illustrations of FIGS. 5A to 5C. In this embodiment, the sample block 700 is retracted from the blade 304 between the cutting operations 1 and 2 and additionally laterally repositioned. Also in such an embodiment, the order of forming first and second sections, and their number, is freely selectable, in contrast to methods according to the prior art.

While, in the embodiments schematically illustrated in FIGS. 5A and 5B, the first surface region 703 and the second surface 705 region are provided as disjoint surface regions of the sample block 700, either by using a suitable embedding mould or by corresponding trimming as explained above, FIG. 5C illustrates an embodiment wherein the first surface region 703 and the second surface region 705 are provided as joint surface regions of the sample block 700. The cutting operations 1 and 2 may be performed essentially as previously explained for FIG. 5B, i.e. by retracting and additionally laterally repositioning the sample block 700 from the blade 304 between the cutting operations 1 and 2.

FIG. 5 schematically illustrates a method 900 according to an embodiment of the present invention in a procedural plan.

As repeatedly discussed before, the method 900, which is provided for preparing a microscopic sample 600 for examination in an electron microscope, comprises embedding 902 said sample 600 in an embedding medium 512 producing a sample block 700 and serially sectioning 906 said sample block 700 using a microtome 100 producing a section ribbon 800 as explained. In the method 900, said embedding 902 is performed using an embedding mould 500 as also explained. The method comprises, as commonly indicated with a step 904, placing said sample 600 into a first compartment 508 but not a second compartment 510 of the mould 500, filling said first compartment 508, said second compartment 510 and an undivided inner space 506 of the mould 500 at least partially with an embedding medium 512 and curing said embedding medium 512. Said serial sectioning 906 includes forming said first sections 802 from a part 702 of the sample block 700 cured in said first compartment 508 and forming said one or more second sections 804 from a part 704 of the sample block 700 cured in said second compartment 510. In a step 908, sections ribbons 800 formed accordingly may be fished from the liquid surface 306.

FIG. 5 schematically illustrates a method 1000 according to a further embodiment of the present invention in a procedural plan.

In the method 1000, a section ribbon 800 is produced from a sample block 700 using a microtome 100 comprising a blade 304 essentially as explained above. As mentioned before, the section ribbon 800 is produced to comprise a first part ribbon with one or more first sections 802 of the sample block 700 and a second part ribbon with one or more second sections 804 of the sample block 700, wherein the first part ribbon is produced from a first surface region 703 of the sample block 700 and the second part ribbon is produced from a second surface region 705 of the sample block 700, the second surface region 705 being different from the first surface region 703.

The method 1000 may include a step 1002 of producing the sample block 700, wherein the first surface region 703 and the second surface 705 region may be provided as joint or disjoint surface regions of the sample block 700. If the first surface region 703 and the second surface 705 region are provided as disjoint regions, the step 1002 of producing the sample block 700 may include the method steps essentially as explained for method 900 or any other equivalent embodiment as explained above, i.e. by using an embedding mould 500 with compartments 508, 510 as explained above. In an alternative embodiment, the step 1002 of producing the sample block 700 may include forming a precursor block 700 and trimming the same to form the disjoint surface regions 703, 705. A yet further alternative includes providing the sample block with joint first and second surface regions 703, 705.

Method 1000 then proceeds with a step 1004 in which a first ("sample") section 802 of a section ribbon 800 is formed from the sample block 700. In a step 1006 it is decided whether a target or desired number of first sections 802 has been formed, and thus the formation of a first part ribbon is completed. If this is not the case, the method returns to step 1004 and a further first section 802 is formed, thus elongating the first part ribbon. If the target or desired number of first sections 802 has been formed, the method 1000 proceeds to a step 1008 in which the sample block 700 is retracted from the blade 304 of the microtome 100, a step which additionally may be performed between each instance of step 1004.

In a subsequent step 1010, a second ("blank") section 804 of a section ribbon 800 is formed from the sample block 700. Similarly to step 1006 above it is decided in a step 1012 whether it is decided whether a target or desired number of second sections 804 has been formed, and thus the formation of a second part ribbon is completed. If this is not the case, the method returns to step 1010 and a further second section 804 is formed, thus elongating the second part ribbon. If the target or desired number of second sections 804 has been formed, the method 1000 proceeds to a step 1014, in which it either may be decided that the method 1000 has been completed or should be repeated for forming a further section ribbon 800.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

1,2 Cutting operations
10*a*-10*d* Microtome movements
10*e* Cutting window
100 Ultramicrotome
102 Housing
104 Sample arm
106 Observation microscope
108 Sample holder
110 Handle
150 Control unit
300 Blade unit
302 Liquid trough
304 Blade
306 Liquid surface
400 Transfer element
500 Embedding mould
502 Wall
504 Lid
506 Common inner space
508 First compartment
510 Second compartment
509 Dividing element
600 Sample
602 Sample part
700 Sample block
702 First part of sample block
703 First surface region
704 Second part of sample block
705 Second surface region
800 Section ribbon
802 First section
802 Second section
900 Method
902 Embedding

904 Sample placement, curing
906 Serial Sectioning
908 Fishing

The invention claimed is:

1. A method for producing a section ribbon from a sample block, the method comprising:

producing a first part ribbon of the section ribbon from a first surface region of the sample block using a microtome comprising a blade, the first part ribbon having one or more first sections of the sample block, producing a second part ribbon of the section ribbon from a second surface region of the sample block using the microtome comprising the blade, the second part ribbon having one or more second sections of the sample block, wherein the second surface region and the first surface region are different surface regions of the sample block before the producing the first part ribbon and the producing the second part ribbon, and retracting the sample block from the blade between the producing of the first part ribbon and the producing of the second part ribbon.

2. The method according to claim 1, further comprising producing the sample block, wherein the first surface region and the second surface region are provided as disjoint surface regions of the sample block.

3. The method according to claim 2, wherein producing the sample block comprises:

providing a precursor sample block, the precursor sample block comprising joint precursor regions of the first surface region and the second surface region, and trimming the precursor sample block to form the first surface region and the second surface region from the joint precursor regions.

4. The method according to claim 2, wherein producing the sample block comprises providing the sample block using an embedding mould configured to form the first surface region and the second surface region as the disjoint surface regions.

5. The method according to claim 4, wherein producing the sample block comprises embedding a sample in an embedding medium in the embedding mould.

6. The method according to claim 5, wherein the embedding mould comprises an undivided inner space, a first compartment and a second compartment, the first compartment and the second compartment extending from and being contiguous with the undivided inner space, and wherein the embedding of the sample comprises:

placing the sample into the first compartment but not in the second compartment, filling the first compartment, the second compartment and the undivided inner space at least partially with the embedding medium, and curing the embedding medium, wherein the first surface region is in a first part of the sample block cured in the first compartment, and wherein the second surface region is in a second part of the sample block cured in the second compartment.

7. The method according to claim 6, wherein each of the one or more first sections includes a part of the sample, and wherein each of the one or more second sections does not include any part of the sample.

8. The method according to claim 1, further comprising producing the sample block, wherein the first surface region and the second surface region are provided as joint surface regions of the sample block.

9. The method according to claim 8, wherein the sample block is repositioned in one or more directions relative to the blade between the producing of the first part ribbon and the producing of the second part ribbon.

10. The method according to claim 1, wherein the microtome comprises an ultra-microtome, and wherein the one or more first sections and the one or more second sections are produced as ultrathin sections.

11. A method for preparing a sample for examination in an electron microscope, the method comprising:

embedding the sample in an embedding medium to produce a sample block, and serially sectioning the sample block using a microtome to produce a section ribbon, wherein the section ribbon comprises one or more first sections of the sample block including a part of the sample and one or more second sections of the sample block not including any part of the sample, wherein the embedding of the sample is performed using an embedding mould comprising an undivided inner space, a first compartment and a second compartment, the first compartment and the second compartment extending from and being contiguous with the undivided inner space, wherein the embedding of the sample comprises:

placing the sample into the first compartment but not in the second compartment, filling the first compartment, the second compartment and the undivided inner space at least partially with the embedding medium, and curing the embedding medium, wherein the serial sectioning of the sample block includes forming the one or more first sections from a first part of the sample block cured in the first compartment, and forming the one or more second sections from a second part of the sample block cured in the second compartment.

12. The method according to claim 1, wherein the section ribbon is made to float on a liquid surface while being formed, the one or more first sections being pushed forward on the liquid surface to a target position on the liquid surface by a transfer distance, the pushing forward comprising forming a plurality of the second sections in the second part ribbon in a cumulative length corresponding to the transfer distance after forming the one or more first sections in the first part ribbon.

13. The method according to claim 6, wherein the sample block is mounted in the microtome such that the first part of the sample block cured in the first compartment is arranged vertically below and in a common vertical plane with the second part of the sample block cured in the second compartment.

14. The method according to claim 6, wherein, by cutting the second part of the sample block cured in the second compartment, the one or more second sections having a different dimension at least in a cutting direction are formed as compared to cutting the first part of the sample block cured in the first compartment.

15. The method according to claim 14, wherein the different dimension at least in the cutting direction is a larger dimension.

16. A microtome configured to perform a method according to claim 1.

17. A microtome comprising a blade and a sample holder, the microtome being configured to produce a section ribbon from a sample block received in the sample holder, wherein the microtome is configured to produce the section ribbon that comprises a first part ribbon with one or more first sections of the sample block and a second part ribbon with one or more second sections of the sample block, wherein the microtome is configured to produce the first part ribbon from a first surface region of the sample block and to produce the second part ribbon from a second surface region of the sample block, wherein the second surface region and the first surface region are different surface regions of the sample block before the first part ribbon and the second part ribbon are produced, and wherein the microtome is configured to retract the sample block from the blade between the producing of the first part ribbon and the producing of the second part ribbon.

18. The microtome according to claim 17, further comprising a control unit configured to provide control commands on based on a process definition provided before producing the section ribbon, the process definition including a sequence in which to produce the one or more first sections and the one or more second sections to form the first part ribbon and the second part ribbon.

19. An embedding mould adapted to be used in a method according to claim 1, comprising an undivided inner space, a first compartment and a second compartment, the first compartment and the second compartment extending from and being contiguous with the undivided inner space.

20. The embedding mould according to claim 19, wherein at least a part of the undivided inner space is cylindrical and has an inner diameter of 2 to 15 mm.

21. The embedding mould according to claim 19, wherein at least the inner space is surrounded by a wall made of a plastic material, the wall having a thickness of 0.1 to 0.5 mm.

22. The embedding mould according to claim 19 comprising a flat bottom, wherein the first compartment and the second compartment are at least in part formed in a form of indentations in the flat bottom.

23. The embedding mould according to claim 22, wherein the indentations are formed as conical or pyramidal frustra.

24. The embedding mould according to claim 19, wherein the first compartment and the second compartment comprise portions divided by a dividing structure formed in the embedding mould.

25. The embedding mould according to claim 19, wherein the first compartment and the second compartment have different sizes or comprise different cross sections in a common plane.

26. The embedding mould according to claim 25 wherein the common plane is perpendicular to a longitudinal axis of the inner space, wherein a line in the common plane transects the first compartment and the second compartment, and wherein a length of the transection with the first compartment is shorter than a length of the transection with the second compartment.

* * * * *